United States Patent
Iyer et al.

(10) Patent No.: US 11,436,667 B2
(45) Date of Patent: Sep. 6, 2022

(54) PURE-SPOT AND DYNAMICALLY REBALANCED AUTO-SCALING CLUSTERS

(71) Applicants: Hariharan Iyer, Bangalore (IN); Joydeep Sen Sarma, Bangalore (IN); Mayank Ahuja, Cupertino, CA (US)

(72) Inventors: Hariharan Iyer, Bangalore (IN); Joydeep Sen Sarma, Bangalore (IN); Mayank Ahuja, Cupertino, CA (US)

(73) Assignee: Qubole, Inc., Mountain View, CA (US)

( * ) Notice: Subject to any disclaimer, the term of this patent is extended or adjusted under 35 U.S.C. 154(b) by 482 days.

(21) Appl. No.: 15/176,061

(22) Filed: Jun. 7, 2016

(65) Prior Publication Data
US 2016/0358249 A1   Dec. 8, 2016

Related U.S. Application Data

(60) Provisional application No. 62/172,417, filed on Jun. 8, 2015.

(51) Int. Cl.
*G06Q 30/08* (2012.01)
*H04L 67/10* (2022.01)

(52) U.S. Cl.
CPC .............. *G06Q 30/08* (2013.01); *H04L 67/10* (2013.01)

(58) Field of Classification Search
CPC ................................ H04L 67/10; G06Q 30/08
See application file for complete search history.

(56) References Cited

U.S. PATENT DOCUMENTS

| | | |
|---|---|---|
| 5,603,001 A | 2/1997 | Sukegawa et al. |
| 5,907,675 A | 5/1999 | Aahlad |
| 6,192,391 B1 | 2/2001 | Ohtani |
| 6,460,027 B1 | 10/2002 | Cochrane et al. |
| 6,601,062 B1 | 7/2003 | Deshpande et al. |
| 6,847,962 B1 | 1/2005 | Cochrane et al. |
| 7,680,994 B2 | 3/2010 | Buah et al. |

(Continued)

OTHER PUBLICATIONS

K. Appleby and G. Goldszmidt, "Using automatically derived load thresholds to manage compute resources on-demand," 2005 9th IFIP/IEEE International Symposium on Integrated Network Management, 2005. IM 2005., 2005, pp. 747-760, doi: 10.1109/INM.2005.1440848., (Year: 2005).*

(Continued)

*Primary Examiner* — Michelle T Kringen
(74) *Attorney, Agent, or Firm* — Landmark Intellectual Property Law, LLC; Gregory M Murphy

(57) ABSTRACT

The present invention is generally directed to systems and methods of providing automatic scaling pure-spot clusters. Such dusters may be dynamically rebalanced for further costs savings. In accordance with some methods of the present invention may include a method of utilizing a cluster in a big data cloud computing environment where instances may include reserved on-demand instances for a set price and on-demand spot instances that may be bid on by a user, the method including: creating one or more stable nodes, comprising spot instances with a bid price above a price for an equivalent on-demand instance; creating one or more volatile nodes, comprising spot instances with a bid price below a price for an equivalent on-demand instance; using one or more of the stable nodes as a master node; and using the volatile nodes as slave nodes.

19 Claims, 1 Drawing Sheet

(56) References Cited

U.S. PATENT DOCUMENTS

| | | |
|---|---|---|
| 7,844,853 B2 | 11/2010 | Barsness et al. |
| 7,848,261 B2 | 12/2010 | Fachan |
| 8,260,840 B1 | 9/2012 | Sirota et al. |
| 8,296,419 B1 | 10/2012 | Khanna et al. |
| 8,694,400 B1* | 4/2014 | Certain .................. G06Q 30/08 |
| | | 705/35 |
| 8,996,482 B1 | 3/2015 | Singh et al. |
| 9,049,746 B2 | 6/2015 | Periyalwar et al. |
| 9,451,013 B1* | 9/2016 | Roth ................... H04L 67/1097 |
| 9,483,785 B1* | 11/2016 | Corley ............... G06Q 30/0613 |
| 9,531,607 B1* | 12/2016 | Pai .......................... H04L 43/08 |
| 9,571,561 B2 | 2/2017 | Jang |
| 9,645,859 B1 | 5/2017 | Dash et al. |
| 9,860,569 B1* | 1/2018 | Wilms ............. H04N 21/23418 |
| 10,069,693 B1* | 9/2018 | Daptardar ........... H04L 41/5054 |
| 2002/0145983 A1 | 10/2002 | Block et al. |
| 2002/0157113 A1 | 10/2002 | Allegrezza |
| 2003/0005350 A1 | 1/2003 | Koning et al. |
| 2003/0065874 A1* | 4/2003 | Marron ............. G06F 17/30011 |
| | | 711/100 |
| 2004/0193626 A1 | 9/2004 | Colby et al. |
| 2005/0222996 A1 | 10/2005 | Yalamanchi |
| 2005/0278387 A1 | 12/2005 | Kamada et al. |
| 2007/0094290 A1 | 4/2007 | Oka et al. |
| 2007/0109302 A1* | 5/2007 | Tsuboshita ............ G06T 11/206 |
| | | 345/440 |
| 2007/0195810 A1 | 8/2007 | Fachan |
| 2007/0294493 A1 | 12/2007 | Buah et al. |
| 2008/0141065 A1 | 6/2008 | Okabe |
| 2009/0043873 A1 | 2/2009 | Barsness et al. |
| 2009/0182779 A1 | 7/2009 | Johnson |
| 2009/0222418 A1 | 9/2009 | Layman |
| 2009/0327854 A1 | 12/2009 | Chhajer et al. |
| 2010/0153482 A1 | 6/2010 | Kim et al. |
| 2010/0306286 A1 | 12/2010 | Chiu et al. |
| 2011/0119449 A1 | 5/2011 | Neerincx et al. |
| 2011/0167221 A1 | 7/2011 | Pangal et al. |
| 2011/0314485 A1 | 12/2011 | Abed |
| 2012/0047339 A1 | 2/2012 | Decasper et al. |
| 2012/0102291 A1 | 4/2012 | Cherian et al. |
| 2012/0151272 A1 | 6/2012 | Behrendt et al. |
| 2012/0215763 A1 | 8/2012 | Hughes et al. |
| 2012/0304192 A1 | 11/2012 | Grove et al. |
| 2012/0317579 A1* | 12/2012 | Liu ..................... G06F 11/1438 |
| | | 718/104 |
| 2013/0110764 A1 | 5/2013 | Wilf |
| 2013/0117225 A1* | 5/2013 | Dalton .................. G06F 16/119 |
| | | 707/623 |
| 2013/0124483 A1 | 5/2013 | Furuhashi et al. |
| 2013/0132967 A1 | 5/2013 | Soundararajan et al. |
| 2013/0179881 A1 | 7/2013 | Calder et al. |
| 2013/0189969 A1 | 7/2013 | Periyalwar et al. |
| 2013/0204948 A1 | 8/2013 | Zeyliger et al. |
| 2013/0227558 A1 | 8/2013 | Du et al. |
| 2013/0232254 A1 | 9/2013 | Srikanth et al. |
| 2013/0254171 A1 | 9/2013 | Grondin et al. |
| 2013/0290771 A1* | 10/2013 | Kim .................... G06F 11/1415 |
| | | 714/3 |
| 2013/0318379 A1 | 11/2013 | Seshadri et al. |
| 2013/0332612 A1 | 12/2013 | Cai et al. |
| 2014/0040575 A1 | 2/2014 | Horn |
| 2014/0059306 A1 | 2/2014 | Bender et al. |
| 2014/0059552 A1 | 2/2014 | Cunningham et al. |
| 2014/0067992 A1 | 3/2014 | Saeki |
| 2014/0095505 A1 | 4/2014 | Blanchflower et al. |
| 2014/0149590 A1 | 5/2014 | Mallipeddi et al. |
| 2014/0156777 A1 | 6/2014 | Subbiah et al. |
| 2014/0189109 A1 | 7/2014 | Jang |
| 2014/0195558 A1 | 7/2014 | Murthy et al. |
| 2014/0279838 A1 | 9/2014 | Tsirogiannis et al. |
| 2015/0222705 A1 | 8/2015 | Stephens |
| 2015/0234688 A1 | 8/2015 | Dageville et al. |
| 2015/0242197 A1 | 8/2015 | Alfonso et al. |
| 2015/0379026 A1 | 12/2015 | Todd et al. |
| 2016/0065627 A1 | 3/2016 | Pearl et al. |
| 2016/0179581 A1 | 6/2016 | Soundararajan et al. |
| 2016/0224638 A1 | 8/2016 | Bestler et al. |
| 2016/0350371 A1 | 12/2016 | Das et al. |
| 2016/0371193 A1 | 12/2016 | Floratou et al. |
| 2017/0337138 A1 | 11/2017 | Li et al. |
| 2018/0159727 A1 | 6/2018 | Liu et al. |

OTHER PUBLICATIONS

International Search Report for PCT/US2015/045419 completed Oct. 2, 2015; 2 pages.

International Search Report for PCT/US2015/050174 completed Nov. 16, 2015; 2 pages.

International Search Report for PCT/US2015/057003 completed Dec. 13, 2015; 2 pages.

* cited by examiner

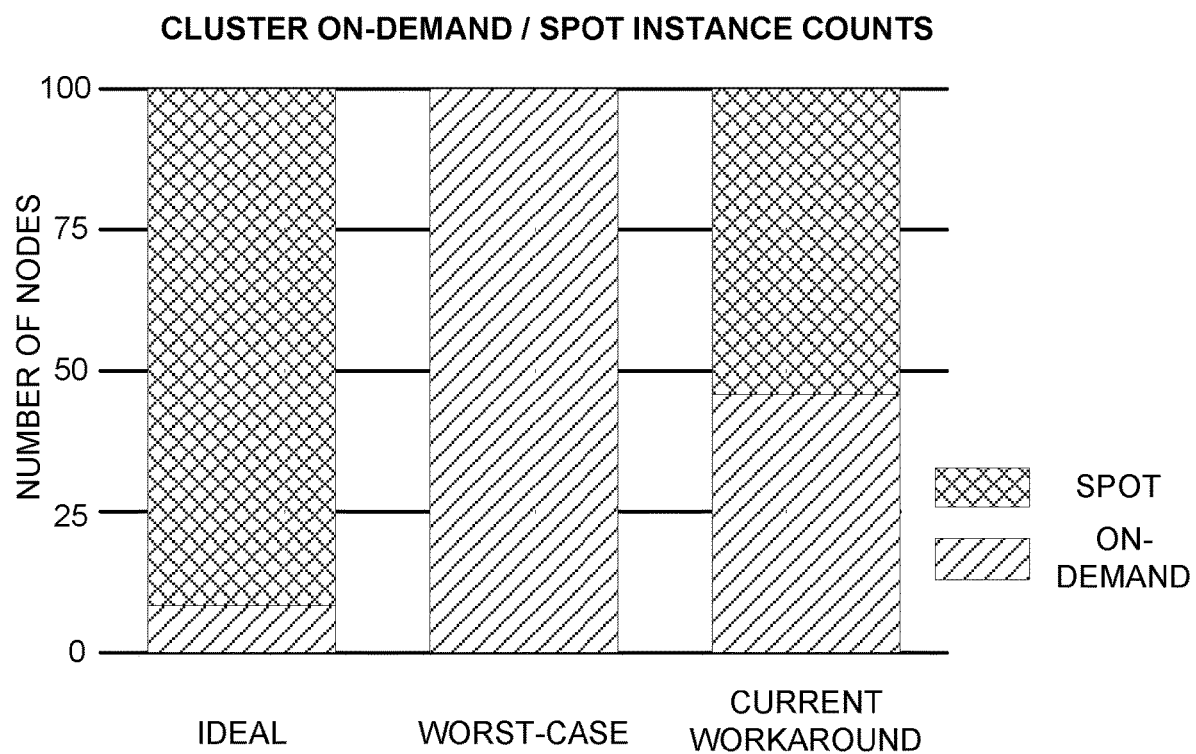

PURE-SPOT AND DYNAMICALLY REBALANCED AUTO-SCALING CLUSTERS

FIELD OF THE INVENTION

In general, the present invention is directed to dynamically rebalanced auto-scaling clusters used in Big Data cloud services. More specifically, the present invention presents systems and methods for utilizing spot instances as needed.

BACKGROUND

The term "Big Data" generally refers to a collection of data sets that, may be difficult to process using traditional data processing applications due- to its size and/or complexity. Due to its size, processes to capture, process, manage, and/or curate the data within a reasonable time may be quite difficult. Big Data has been defined to include a high volume of data, high velocity processing speed, high variety of information, and high veracity or accuracy of information and analytics.

Big Data may be utilized in virtually any service or product. Ranging from science and research applications (such as, for example, data, collected by the Large Hadron Collider, or information related to the human genome) to those in everyday life (such as, for example, services provided by Facebook, Amazon, eBay), the ability to process Big Data and determine meaningful conclusions therefrom is becoming a necessity.

As Big Data has grown, computing resources necessary to efficiently handle such, data is required. Due to certain constraints—ranging from cost to physical space—cloud computing has provided resources that can be tapped in order to process Big Data, Big Data systems may be quite powerful and may process petabytes of data and run on upwards of thousands of machines. However, there are periods when such systems are underutilized and other periods when such systems are over-taxed. Accordingly, it is desirable to have a Big Data system that can be adapt to workload and scale up and down, thereby leading to better utilization of resources and reducing costs.

Cloud computing has what can be referred to as an elastic property, in that virtual machines in the cloud can be used on-demand on an as-needed basis, thereby providing resources that are suitable for specific processing tasks or functions. However, the flexibility of resources in a cloud computing environment can be difficult to control. Determining the proper amount of resources at the outset of an activity can be difficult, particularly when the loads of certain applications fluctuate.

Many customers of Big Data cloud services operate Hadoop clusters on Amazon Web Services (AWS), often because of compelling advantages it provides as a leading cloud services provider. A feature that AWS offers is Spot Instances, which in general are spare EC2 instances (elastic compute cloud instances) where the price may be set in real time based on supply and demand. Spot Instances generally operate on a bid-based system where the user bids the maximum the user is willing to pay for the instance, and if the current Spot Price is less than that, the instance is granted to the user. This may provide a user with significant cost savings for large Hadoop cluster. In contrast, on-demand instances for which the user pays a fixed, pre-determined price for every hour of usage are generally much more expensive. For example, examining the spot price for m3.xlarge nodes in us-east-1 region from 28 Apr.-6 May 2015 one may see that Spot Instances are offered at nearly a 90% discount from the on-demand price ($0.280) of the same instance type.

However, the use of Spot Instances offers some disadvantages. Significantly, AWS can take the node away from the user at any time. For example, if the demand for the Spot Instance increases and the Spot Price exceeds the bid price offered by the user, the Spot Instance will be terminated. One way to reduce the probability of this is to use higher bid prices. However, even with very high bid prices, the instance may be terminated if AWS can no longer spare instances of the specific type.

Moreover, there is no guarantee that Spot Instances requested will be granted. If the current Spot Price exceeds the bid price, or there is not enough spare capacity, the Spot Instance Request will be rejected. However, this is very unlikely with on-demand instances. In addition, Spot Instances are slow to be granted (can take several minutes), whereas on-demand instances are generally granted almost instantaneously.

Instances similar to Spot Instances are also available at other Cloud vendors, such as Google, who offers preemptible virtual machines. Similar to AWS Spot Instances, Preemptible virtual machines offer significant cost savings, but may be shut down at any time. Google offers the Preemptible virtual machines in order to use spare capacity in datacenters. However, the use of this spare capacity is limited to a twenty-four (24) hour runtime, and can be preempted at any time.

Accordingly, systems and methods of taking advantage of Spot Instances (and similar products such as preemptible virtual machines) while reducing drawbacks are desirable.

SUMMARY OF THE INVENTION

Aspects in accordance with some embodiments of the present invention may include a method of utilizing a cluster in a big data cloud computing environment where instances may include reserved on-demand instances for a set price and on-demand spot instances that may be bid on by a user, the method comprising: creating one or more stable nodes, comprising spot instances with a bid price above a price for an equivalent on-demand instance; creating one or more volatile nodes, comprising spot instances with a bid price below a price for an equivalent on-demand instance; using one or more of the stable nodes as a master node; and using the volatile nodes as slave nodes.

Some aspects in accordance with some embodiments of the present invention may include a method of utilizing a pure spot cluster comprised of only spot instances in a big data cloud computing environment where instances may include reserved on-demand instances for a set price and on-demand spot instances that may be bid on by a user, the method comprising: creating one or more stable nodes, comprising spot instances with a bid price above a price for an equivalent on-demand instance; creating one or more volatile nodes, comprising spot instances with a bid price below a price for an equivalent on-demand instance; using one or more of the stable nodes as a master node; using the volatile nodes as slave nodes; wherein the cluster has pre-established ratio of stable nodes to volatile nodes, and rebalancing the cluster when the number of stable nodes exceeds the pre-established ratio by swapping out stable nodes for volatile nodes.

Some aspects in accordance with some embodiments of the present invention may include a method of utilizing a pure spot cluster comprised of only spot instances in a big data cloud computing environment where instances may include reserved on-demand instances for a set price and on-demand spot instances that may be bid on by a user, the method comprising: creating one or more stable nodes, comprising spot instances with a bid price above a price for an equivalent on-demand instance; creating one or more volatile nodes, comprising spot instances with a bid price below a price for an equivalent on-demand instance; using one or more of the stable nodes as a master node; using the volatile nodes as slave nodes; wherein the cluster has pre-established ratio of stable nodes to volatile nodes, and rebalancing the cluster when the number of stable nodes exceeds the pre-established ratio by swapping out stable nodes for volatile nodes, comprising identifying stable nodes that are not heavily occupied in performing processing tasks; provisioning volatile instances from the big data cloud computing environment; transferring information from the identified stable nodes to the volatile instances; terminating the identified stable nodes.

These and other aspects will become apparent from the following, description of the invention taken in conjunction with the following drawings, although variations and modifications may be effected without departing from the spirit and scope of the novel concepts of the invention.

BRIEF DESCRIPTION OF THE DRAWINGS

The present invention can be more folly understood by reading the following detailed description together with the accompanying drawings, in winch like reference indicators are used to designate like elements. The accompanying figures depict certain illustrative embodiments and may aid in understanding the following detailed description. Before any embodiment of the invention is explained in detail, it is to be understood that the invention is not limited in its application to the details of construction and the arrangements of components set forth in the following description or illustrated in the drawings. The embodiments depicted are to be understood as exemplary and in no way limiting of the overall scope of the invention. Also, it is to be understood that the phraseology and terminology used herein is for the purpose of description and should not be regarded as limiting. The detailed description will make reference to the following figures, in which:

FIG. 1 Illustrates a balance of a cluster comprising on-demand instances and Spot instances, in accordance with some embodiments of the present invention.

Before any embodiment of the invention is explained in detail, it is to be understood that the present invention is not limited in its application to the details of construction and the arrangements of components set forth in the following description or illustrated in the drawings. The present invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

The matters exemplified in this description are provided to assist in a comprehensive understanding of various exemplary embodiments disclosed with reference to the accompanying figures. Accordingly, those of ordinary skill in the art will recognize that various changes and modifications of the exemplary embodiments described herein can be made without departing from the spirit and scope of the claimed invention. Descriptions of well-known functions and constructions are omitted for clarity and conciseness. Moreover, as used herein, the singular may be interpreted in the plural, and alternately, any term in the plural may be interpreted to be in the singular.

As noted above, various Big Data cloud service providers offer unused instances (and other computing elements) for bidding. AWS terms such instances "Spot Instances." Google terms such devices "Preemptible virtual machines." Regardless of the terminology, the systems and methods of the present invention present manners of working with such elements. For consistency and ease of reading, the term "Spot instances" will be used. However, note that such term is intended to apply to similar products from other cloud service providers, such as Preemptible virtual machines offered by Google.

As discussed above, although Spot Instances may otter significant costs savings, they have various drawbacks. Accordingly, the present invention is generally directed at systems and methods for customers to use Spot instances to reducing costs, while minimizing and/or mitigating the disadvantages.

Data services provided by other parties (such as but not limited to Qubole Data Service), may offer a variety of compute clusters based on technologies such as Hadoop, YARN and Presto with a deep integration into Spot instances offered by AWS. For example, the workload in a Hadoop cluster may not be uniform, and accordingly there may be unexpected spikes. Auto-scaling clusters may use Spot instances to add more compute power when required, and scale down the cluster size when the load recedes. Automatic addition of compute capacity may provide an opportunity to use Spot Instances for auto-scaling at significantly lower costs compared to On-Demand Instances.

However, there are several drawbacks to the use of Spot Instances for auto-scaling clusters. For example, availability of Spot Instances is not guaranteed. As a result relying only on Spot Instances does not guarantee the clusters will be able to scale up when required. This may lead to poor response times (for ad-hoc workloads) or missed deadlines (for periodic batch workloads).

Nodes dynamically added to a Hadoop cluster may be used as compute nodes (for example, running TaskTracker) or as data nodes (for example, running a DataNode daemon) or both. If Spot Instances are used only as compute nodes—then the core nodes (data nodes that are part of HDFS) may quickly become an input-output bottleneck, and may therefore slow down an entire cluster.

If Spot instances are used as data nodes—then a cluster may become unstable, since Spot instances may be terminated anytime without notice. As noted above, this may occur if the Spot Price exceeds the bid price. Frequent spikes in the Spot Price are common and aggravates the problem. Spot instances working as data nodes may lose replicas of Hadoop Distributed File System (HDFS) files residing on these nodes and the HDFS may become corrupt as a result. Moreover, using a very high bid amount in order to guarantee spot instance availability can have very unexpected financial implications.

However, there are some approaches to using Spot instances in Hadoop clusters that may minimize some of the challenges noted above. When a Hadoop cluster is first started (with a single Hadoop master node and a minimum number slaves as configured by the user), all the nodes may be On-Demand instances. This may enable a start with a small stable cluster that may be used to orchestrate advanced provisioning and data placement strategies. Depending on the workload, the cluster may then automatic-ally auto-scale adding more nodes.

Users may then be presented with options to choose from one of the following broad categories of auto-scaled clusters: (1) On-Demand Instances only, where the auto-scaled nodes added are only On-Demand Instances. In general, this mode has maximum stability and maximum cost associated with it. (2) Spot Instances only, where the auto-scaled nodes added are only Spot Instances. This mode may be suitable for workloads which are not time critical and users want to have minimum cost. (3) Hybrid—here the auto-scaled nodes may be a mix of Spot and On-Demand Instances, and users may configure the maximum percentage of Spot Instances in the cluster. Such provisioning strategies were followed both while up-sealing and down-sealing. For example, when a cluster returns to its minimal size, it may be composed only of the initial On-Demand instances.

Since the use of Spot Instances is highly dependent on bidding an acceptable and stable bid, a user interface may be presented that asks users to set a percentage of the regular Oil-Demand price the user is willing to pay; as well, as a timeout on that bid. For example, a 90% bid level for m1.xlarge in us-east availability zone translates to a maximum bid of around 31.5¢/hour (as of June 2015). If a Spot Instance was not allocated within user configurable timeout period, the hybrid cluster may automatically scale using regular On-Demand instances. Accordingly, users may choose a bidding strategy.

There are several recognized bidding strategies. For example, a user may bid very low and set a large timeout. This approach may minimize cost by getting instances only when available at low price. Alternatively, a user may bid at about 100% (or just above). This may generally achieve cost reduction, while occasionally falling back to On-Demand instances. Finally, a user may bid very high (for example, 200%) and be virtually guaranteed to get an instance even when AWS is running low on excess capacity.

Hybrid auto-scaled clusters may be generally suitable for applications that may use Spot Instances for lower costs, but may also require additional stability for avoiding data corruption. Hybrid clusters may have a new HDFS block placement policy which ensures that at least one replica of a file local to a Spot Instance resides on a stable On-Demand instance. Therefore, if the cluster looses a Spot Instance (due to, for example, bid prices rising above a current bid) a replica, of the data may exist on On-Demand instances. Such data may then be replicated to other nodes conforming to cluster's replication factor. Accordingly, Spot Instances participated as data nodes in the cluster without compromising the availability and integrity of HDFS. When the Spot instances were added, the storage-capacity and the bandwidth of the cluster increases and the cluster is no longer bottle-necked by the core nodes.

Pure Spot Clusters.

Initial attempts at using Spot Instances often forced users to use regular instances (called On-Demand or Reserved instances in AWS) for the master node in the cluster and the initial (minimum) set of slave nodes. Furthermore—to make sure that data was not lost suddenly due to Spot Instances being taken away—users would typically use a mix of Spot Instances and On-Demand Instances, even for additional nodes added by auto-sealing. In such cases, and in accordance with some embodiments of the present invention, custom block placement policy requires that one copy of the data was always placed on On-Demand instances.

While this mode generally offers a good mix of lowered cost and high operational stability—it generally did not allow a cluster composed of only Spot nodes. However, in accordance with some embodiments of the present invention, pure Spot auto sealing clusters may be utilized without compromising on stability or availability.

It was recognized that a Spot Instance with a very high bid price is similar in stability to an On-Demand node, since high bid price generally stability, in that the instance is unlikely to be terminated based on rising Spot Instance rates. Moreover, because of the auction mechanism inherent in Spot Instance bidding, a user may usually continue to pay lower prices prevalent in the Spot marketplace most of the time, unless the price is driven upwards by demand.

In accordance with some embodiments of the present invention, the auction mechanism is leveraged. Leveraging the auction mechanism, for Spot Instances enables the creation of what is termed "Stable Nodes." A Stable Node is either (i) an On-Demand Node; or (ii) a Spot node with a super-normal bid price (that is, a bid price that may be significantly higher than 100% of the regular On-Demand price). In other words, a Stable node may have a high availability due to its bid price, and may be obtained by different provisioning techniques. Conversely, a Volatile Node may be a node that has potentially low availability. For example, Spot Nodes with a low bid price may be considered volatile nodes.

Use of Stable Nodes.

Stable nodes may be used in place of On-Demand nodes. For example, unlike initial uses of Spot Instances, Stable Nodes utilizing Spot Instances may be used for the Master and the initial or minimum set of nodes. In addition, in a hybrid environment, both stable and volatile nodes may be used, similar to early approaches that combined Spot instances with On-Demand nodes.

By composing clusters with Stable Nodes that are obtained by super-normal bids—a cluster composed entirely of Spot Instances may be operated. This may lead to substantial cost reduction, without compromising on the availability and stability of the resultant compute cluster.

Distinguishing Node Type.

However, a challenge in this approach may be clearly distinguishing which nodes are Stable and which nodes are Volatile, when both utilize Spot Nodes. Approaches to make this determination may include basing a determination between a Stable Node and a Volatile node based upon bid values, or by specifically tagging Stable Nodes (or alternatively, tagging Volatile nodes). However, since tagging is not an automatic operation that occurs on the launching of an instance—and since the tagging process itself may result in bottlenecks, distinguishing nodes based on bid values may be desirable. Note that if tagging can be accomplished automatically and/or without causing a bottleneck, tagging nodes may also be desirable.

Fall Back Options.

However, Spot Instances may not always be available (due to the ability of the provider (AWS, Google, etc.) to pull the instance if the provider needs additional, computing resources). Accordingly, a user may generally configure data services in accordance with systems and methods of the present invention to automatically fall back to On-Demand instances. Falling back may be necessary or desirable to complete compute workloads in sufficient and/or expected time periods. However, if the On-Demand nodes are present for falling back, such On-Demand nodes may continue to be used as long as the cluster is occupied, thus driving up the cost of the cluster.

In a negative scenario, if a Spot Instances cannot be obtained for a long time, an entire cluster may be composed of on-demand nodes, and may continue to be so until the cluster is either downscaled (and then up-scaled, again) or terminated.

One approach to address this issue may be by creating a cluster with a critical mass of on-demand nodes that is the minimal sufficient, for running the workload. Additional and remaining nodes may comprise Spot Instances that are not fall back enabled. However, this approach may not be the most cost effective, since a user may want to keep the number of on-demand nodes as low as possible while still availing the benefits of the fallback option.

FIG. 1 illustrates an exemplary and hypothetical 100-node cluster with such ideal, worst-case and current scenarios, in accordance with some embodiments of the present invention.

Quickly Bringing Up Pure Spot Clusters.

Additional difficulties are present m the ability to quickly bring up clusters, particularly pure-Spot clusters. Quickly bringing up clusters is important to achieving and/or maintaining processing speeds. However, quickly bridging up clusters may be complex since some nodes in a cluster (slave nodes) may need the IP address of another node or nodes (master nodes) to form a functional cluster.

One approach to bringing up clusters quickly is to boot master and slave nodes in parallel. In general, such a process may comprise launching a master node, and obtaining an instance identification from the cloud provider. Note that this may be done before the master has completedly booted up. Slave nodes may then be launched, and may be send the master instance identification. Slave nodes may poll the cloud provider (e.g., AWS, Google, etc.) for the IP address of the master before completing the slave node boot.

However, this approach may be problematic for pure spot clusters, since if the master node is a spot node, launching and booting a spot node may take significantly longer. As noted above, bidding on the spot market and falling back may take some time, thereby slowing this process down.

In accordance with some embodiments of the present invention, initialization of a pure spot cluster may comprise: (i) assigning a unique location in cloud storage, to store a master instance identification while the cluster is brought up; (ii) in parallel both (a) launching a master node and once booted, writing its instance identification to cloud storage in boot sequence, and (b) launching slave nodes, and once booted reading the master instance identification from cloud storage, and poll the cloud provider for the IP address of the master before completing the booting process.

This technique may be used to share common metadata across more complex clusters. For example, a high availability (HA) configuration may have multiple master nodes, as well as other nodes whose instance metadata may be needed by slave nodes.

Rebalancing.

Clusters in the data services systems in accordance with some embodiments of the present invention may rebalance the cluster when the number of Stable nodes exceeds the ratio requested by the user. At a high level, this may be accomplished by swapping out Stable instances for Volatile Instances at opportune moments (e.g., when the Spot instance availability is higher). This process may comprise several steps.

First, Stable nodes that are not heavily occupied in performing tasks may be identified. Such, instances may be likely candidates for being swapped out. Volatile instances (such as Spot Instances) may be provisioned, for example, front the AWS market. The stable instances first identified may be shut down, in a "graceful shutdown," as discussed below. Upon completion of the graceful shutdown, the node may be terminated.

Over time, this self-healing process may drive the cluster from even the worst-case configuration to one that is composed of a healthy mix of on-demand and Spot instances. This may ameliorate the risk of running a cluster with a very small number of on-demand nodes, and may enable the customer to use an ideal, or near ideal configuration discussed above. The customer may rest easy in the knowledge that once the workload peters out, the excess on-demand nodes will either be removed (due to downscaling) or replaced due to rebalancing.

Graceful Shutdown.

A basic mechanism that may be used in rebalancing a cluster may be the ability to release a node that, it is no longer required. This is referred to as a Graceful Shutdown. While the precise steps for this process depending on the particular kind of processing (Map-Reduce vs. Tez vs. Spark, etc.)—the broad outlines are as follows.

First, no new work is scheduled on the target node. Depending on the implementation details, this may include stop scheduling new (HDFS) data-writes on the target node. Next, if there is State stored on the node that is critical for the functioning of the cluster, this is backed up or replicated elsewhere. For example, this may comprise generating intermediate data from completed tasks (mappers), and backing up to Amazon Simple Storage Service (S3), and data in HDFS that resides on the target node may be replicated to an alternate node.

In some situations a currently running task on a target node may be terminated and scheduled elsewhere. For example, this may be done where the task will take a long time to finish because it is waiting for some other task or event. Otherwise, after storing any critical information, tasks running on the node to be shutdown may run to completion.

Part of a rebalancing strategy may include correctly identify nodes that may be Gracefully Shutdown. One of the complexities of a node-rebalancing algorithm may be that once spot nodes (i.e., volatile nodes) have been procured—some nodes must be shut down in order to keen the cluster within the desired size limits. However—if the Graceful Shutdown takes a long time (for example if the node has long running tasks that cannot be preempted)—then the cluster may run at over-capacity for a long duration.

Accordingly, the amount of time that will be taken to gracefully shutdown a node may be estimated, and then systems and methods in accordance with some embodiments of the present invention may consider nodes that can be shut down within some reasonable time period (for example, in one (1) hour). While the precise heuristics to estimate shutdown time differ, some exemplary factors used for nodes participating in Map-Reduce computation may assist in determining the shutdown time.

For example, if there are reducer tasks running that are below 66% complete (for example, if the nodes are still shuffling data), the graceful shutdown period may be considered infinite and the node should not be considered for graceful shutdown. In another example, the graceful shutdown time of a node may be least the maximum of the completion time of all currently running tasks on that node. The completion time of each task may be calculated from its current progress percentage and the time elapsed since the start of the task.

In another example, the graceful shutdown time of a node may be at least equal to the time required to backup any required state on the node. This may be calculated by dividing the size of the total state by the available bandwidth on the node. Finally, in another example, the graceful shutdown time of a node may be the combination of the time required to complete all currently running tasks on the node and backup any required state. Once a set of nodes that can be shut down have been identified, the nodes that have the minimum projected shutdown period may be utilized.

Finally, data services in accordance with systems and methods of the present invention may allow users to pick a maximum size for a cluster. However, the maximum size selected may be difficult to comport with the node rebalancing algorithm. In other words, a cluster at maximum size may be prohibited from rebalancing (even if rebalancing would be advantageous to the user). Accordingly, in order to allow such, rebalancing, a cluster may be permitted to grow to a certain percentage over the maximum size (for example, 10% over the selected maximum size). This percentage may be user configurable. However, if a cluster is already above its maximum size, no further rebalancing may be triggered. This may be taken, conservatively, as an indicator that rebalancing may already be in progress.

It will be understood that the specific, embodiments of the present invention shown and described herein, are exemplary only. Numerous variations, changes, substitutions and equivalents will now occur to those skilled in the art without departing from the spirit and scope of the invention. For instance, the while the approaches above have been discussed primarily with AWS Spot Nodes, similar approaches can be used in other environments, for example in the Google Cloud Platform using Preemptible virtual machines. Accordingly, it is intended that all subject matter described herein and shown in the accompanying drawings be regarded as illustrative only, and not in a limiting sense.

What is claimed is:

1. A method of utilizing a cluster in a big data cloud computing environment where instances may include reserved on-demand instances, with a set price and spot instances, which may be bid on by a user, the method comprising:
   creating one or more stable nodes, comprising an on-demand instance or an equivalent spot instance with a bid price above a price for the on-demand instance;
   creating one or more volatile nodes, comprising spot instances with a bid price below the price for the on-demand instance;
   using one or more of the one or more stable nodes as a master node; and
   using one or more of the one or more volatile nodes as slave nodes; and
   rebalancing the cluster when the number of stable nodes exceeds a pre-established defined ratio of stable nodes to volatile nodes as requested by the user.

2. The method of claim 1, wherein the cluster is a pure spot cluster, comprised only of spot instances.

3. The method of claim 1, further comprising differentiating one or more of the one or more stable nodes from one or more of the one or more volatile nodes based at least in part on the bid price.

4. The method of claim 1, further comprising tagging one or more of the one or more stable nodes for identification.

5. The method of claim 1, further comprising falling back to one or more new on-demand instances when no spot instances are available.

6. The method of claim 1, further comprising bringing up the cluster by:
   launching start up of a master node and writing a master instance identification to a unique location at a cloud storage provider;
   launching start up of one or more slave nodes, and once started up, reading the master instance identification from the unique location.

7. The method of claim 1, wherein rebalancing the cluster comprises swapping out one or more of the one or more stable nodes for one or more of the one or more volatile nodes.

8. The method of claim 7, wherein the one or more of one or more stable nodes are swapped out for one or more of the one or more volatile nodes when spot instance availability is high.

9. The method of claim 7, wherein one or more of the one or more stable nodes are gracefully shutdown, comprising:
   ceasing assignment of any new work to the one or more of the one or more stable node to be shutdown;
   determining if there is a state or data stored on the stable node to be shutdown that is critical to functioning of the cluster, and if so, backing up or replicating the state or data on a stable node that it is not to be shutdown;
   upon a determination that that the stable node to be shutdown is running on a task that is waiting for an event to occur, scheduling the task on a stable node that is not to be shutdown and ceasing the task on the stable node that is to be shutdown;
   upon a determination that the stable node to be shutdown is running on a task that is not waiting for an event to occur, allowing the task to run to completion;
   terminating the stable node to be shutdown.

10. The method of claim 1, wherein swapping out one or more of the one or more stable nodes for volatile nodes comprises:
    identifying one or more of the one or more stable nodes that are not heavily occupied in performing processing tasks;
    provisioning one or more of the one or more volatile instances from the big data cloud computing environment;
    transferring information from the identified one or more of the one or more stable nodes to the one or more of the one or more volatile instances;
    terminating the identified one or more of the one or more stable nodes.

11. A method of utilizing a pure spot cluster comprised of only spot instances in a big data cloud computing environment where instances may include reserved on-demand instances for a set price and spot instances that may be bid on by a user, the method comprising:
    creating one or more stable nodes, comprising an on-demand instance or an equivalent spot instance with a bid price above a price for the on-demand instance;
    creating one or more volatile nodes, comprising spot instances with a bid price below the price for the on-demand instance;
    using one or more of the stable nodes as a master node;
    using the volatile nodes as slave nodes;
    wherein the cluster has pre-established defined ratio of stable nodes to volatile nodes as requested by the user, and rebalancing the cluster when a number of stable nodes exceeds the pre-established ratio by swapping out stable nodes for volatile nodes.

12. The method of claim 11, further comprising differentiating stable nodes from volatile nodes based at least in part on bid price.

13. The method of claim 11, further comprising tagging stable nodes for identification.

14. The method of claim 11, further comprising falling back to on-demand instances when no spot instances are available.

15. The method of claim 11, further comprising bringing up the cluster by:
   launching start up of a master node and writing a master instance identification to a unique location at a cloud storage provider;
   launching start up of one or more slave nodes, and once started up, reading the master instance identification from the unique location.

16. The method of claim 11, wherein swapping out stable nodes for volatile nodes comprises;
   identifying stable nodes that are not heavily occupied in performing processing tasks;
   provisioning volatile instances from the big data cloud-computing environment;
   transferring information from the identified stable nodes to the volatile instances;
   terminating the identified stable nodes.

17. The method of claim 11, wherein the stable nodes are gracefully shutdown, comprising;
   ceasing assignment of any new work to the stable node to be shutdown;
   determining if there is a state or data stored on the stable node to be shutdown that is critical to functioning of the cluster, and if so, backing up or replicating the state or data on a stable node that it is not to be shutdown;
   upon a determination that that the stable node to be shutdown is running on a task that is waiting for an event to occur, scheduling the task on a stable node that is not to be shutdown and ceasing the task on the stable node that is to be shutdown;
   upon a determination that the stable node to be shutdown is running on a task that is not waiting for an event to occur, allowing the task to run to completion;
   terminating the stable node to be shutdown.

18. A method in a big data cloud computing environment where instances may include reserved on-demand instances for a set price and spot instances that may be bid on by a user, the method for utilizing a pure spot cluster comprised only of spot instances, the method comprising:
   creating one or more stable nodes, comprising a spot instance with a bid price above a price for the on-demand instance;
   creating one or more volatile nodes, comprising spot instances with a bid price below the price for the on-demand instance;
   using one or more of the stable nodes as a master node;
   using the volatile nodes as slave nodes;
   wherein the cluster has pre-established defined ratio of stable nodes to volatile nodes as requested by the user, and rebalancing the cluster when the number of stable nodes exceeds the pre-established ratio by swapping out stable nodes for volatile nodes, comprising
   identifying stable nodes that are not heavily occupied in performing processing tasks;
   provisioning volatile instances from the big data cloud computing environment;
   transferring information from the identified stable nodes to the volatile instances;
   terminating the identified stable nodes.

19. The method of claim 18, wherein the step of terminating the identified stable nodes comprises a gracefully shutdown, comprising;
   ceasing assignment of any new work to the stable node to be shutdown;
   determining if there is a state or data stored on the stable node to be shutdown that is critical to functioning of the cluster, and if so, backing up or replicating the state or data on a stable node that it is not to be shutdown;
   upon a determination that that the stable node to be shutdown is running on a task that is waiting for an event to occur, scheduling the task on a stable node that is not to be shutdown and ceasing the task on the stable node that is to be shutdown;
   upon a determination that the stable node to be shutdown is running on a task that is not waiting for an event to occur, allowing the task to run to completion;
   terminating the stable node to be shutdown.

* * * * *